(12) United States Patent
Parthasarathy et al.

(10) Patent No.: US 6,754,807 B1
(45) Date of Patent: Jun. 22, 2004

(54) SYSTEM AND METHOD FOR MANAGING VERTICAL DEPENDENCIES IN A DIGITAL SIGNAL PROCESSOR

(75) Inventors: Sivagnanam Parthasarathy, Carlsbad, CA (US); Alexander Driker, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 522 days.

(21) Appl. No.: 09/652,450

(22) Filed: Aug. 31, 2000

(51) Int. Cl.[7] .............................. G06F 9/34; G06F 9/38; G06F 9/445
(52) U.S. Cl. ...................... 712/218; 712/217; 712/219; 712/245; 712/248; 712/26; 711/125; 711/214; 711/216
(58) Field of Search ................................. 712/219, 245, 712/216, 212, 213, 217, 218, 220, 227, 23, 41, 26, 207, 248; 711/110, 125, 210, 214, 216

(56) References Cited

U.S. PATENT DOCUMENTS

| | | | |
|---|---|---|---|
| 5,442,757 A | 8/1995 | McFarland et al. | 395/375 |
| 5,550,988 A | 8/1996 | Sarangdhar et al. | 395/293 |
| 5,560,032 A | 9/1996 | Nguyen et al. | 395/800 |
| 5,606,670 A | 2/1997 | Abramson et al. | 395/250 |
| 5,625,789 A | 4/1997 | Hesson et al. | 395/393 |
| 5,627,983 A | 5/1997 | Popescu et al. | 395/393 |
| 5,627,985 A | 5/1997 | Fetterman et al. | 395/393 |
| 5,630,157 A | 5/1997 | Dwyer, III | 395/800 |
| 5,644,753 A | 7/1997 | Ebrahim et al. | 395/458 |
| 5,644,759 A | 7/1997 | Lucas et al. | 395/587 |
| 5,664,137 A | * 9/1997 | Abramson et al. | 712/216 |
| 5,710,913 A | 1/1998 | Gupta et al. | 395/588 |
| 5,748,934 A | 5/1998 | Lesartre et al. | 395/392 |
| 5,898,853 A | * 4/1999 | Panwar et al. | 712/216 |
| 6,326,806 B1 | * 12/2001 | Fallside et al. | 326/38 |

* cited by examiner

*Primary Examiner*—Daniel H. Pan
(74) *Attorney, Agent, or Firm*—Lisa K. Jorgenson; William A. Munck (57) ABSTRACT

An apparatus for managing vertical dependencies between instructions in first and second instruction pipelines includes: 1) identifier (ID) reclaim circuitry for determining a sequential set of retired identifiers associated with retired instructions and for determining a next retire ID sequentially following the set; 2) first ID generation circuitry for sequentially assigning identifiers to destination registers associated with instructions entering the pipelines; 3) second ID generation circuitry associated with the first pipeline for identifying a first dependent source register associated with a first dependent source operand of a first instruction entering the first pipeline and assigning an ID of the first register to the first operand; and 4) instruction scheduling circuitry for comparing the first operand ID of the first instruction with the next retire ID and scheduling the first instruction for execution if the first operand ID is less than or equal to the next retire ID.

24 Claims, 4 Drawing Sheets

SYSTEM AND METHOD FOR MANAGING VERTICAL DEPENDENCIES IN A DIGITAL SIGNAL PROCESSOR

TECHNICAL FIELD OF THE INVENTION

The present invention is directed, in general, to digital signal processors (DSPs) and, more specifically, to a method and apparatus for controlling vertical dependencies in a DSP.

BACKGROUND OF THE INVENTION

The availability of high-speed data communications is creating greater demand for ever-faster digital signal processors (DSPs). Digital signal processors are used in mobile phones, cordless phones, wireless personal digital assistant (PDA) devices, local area network (LAN) cards, cable modems, and a host of radio frequency (RF) communication devices, including conventional and high-definition television (HDTV) sets and radio receivers. A number of different approaches have been taken to decrease instruction execution time, thereby increasing DSP throughput.

Traditionally, digital signal processors have been designed to perform optimally on vector code (or array code). Because of this optimization, the performance of a conventional DSP suffers when running scalar code. Scalar code is a special case of vector code in which the array contains only a single element. Despite this drawback, emerging trends in the DSP marketplace indicate that scalar processing will become an increasingly important requirement for digital signal processors.

Managing vertical dependencies poses particular problems in a super-scalar DSP architecture having more than one instruction pipeline. For example, in a 2-way super-scalar architecture, instructions may be issued in order, but may be executed out-of-order in different pipes and the results may be written to the register files out-of-order. However, the instruction must be retired in order. A vertical dependency occurs whenever a first-issued or (previous) instruction generates a result that is stored in a target register and then used by a second issued (or subsequent) instruction. If the subsequent instruction is in a different pipeline (or way) than the previous instruction, it is possible that the subsequent instruction may be ready for execution before the previous instruction is completed. This may cause the subsequent instruction to read an older version of the result from the target register.

Scalar performance can be improved by using elaborate structures like renaming registers, completion buffers, and the like. The problems associated with managing vertical dependencies may also be addressed through the use of re-order buffers. For example, Intel P6 processors, high-end SPARC processors, and PowerPC processors use these structures and deliver impressive scalar performance.

Digital signal processors and apparatuses for handling vertical dependencies in digital signal processors are described in greater detail in U.S. Pat. No. 5,748,934 to Lesartre et al., U.S. Pat. No. 5,442,757 to McFarland et al., U.S. Pat. No. 5,550,988 to Sarangdhar et al., U.S. Pat. No. 5,560,032 to Nguyen et al., U.S. Pat. No. 5,606,670 to Abramsom et al., U.S. Pat. No. 5,625,789 to Hesson et al., U.S. Pat. No. 5,627,983 to Popescu et al, U.S. Pat. No. 5,627,985 to Fetterman et al., U.S. Pat. No. 5,630,157 to Dwyer, U.S. Pat. No. 5,644,753 to Ebrahim et al., U.S. Pat. No. 5,644,759 to Lucas et al. The teachings of the above-referenced patents are hereby incorporated by reference into the present disclosure as if fully set forth herein.

Unfortunately, the prior art circuits used to handle vertical dependency problems take up silicon area, increase design complexity, and consume power. Unfortunately, silicon area and power consumption are very important considerations in communication applications, such as mobile phones, and peripheral applications.

Therefore, there is a need in the art for improved digital signal processors that provide improved scalar performance. In particular, there is a need in the art for improved digital signal processors that provide improved management of vertical dependencies during scalar operations. More particularly, there is need for improved digital signal processors that are capable of efficiently handling vertical dependencies without using complex circuitry that occupies a large amount of circuit space and that consumes a large amount of power.

SUMMARY OF THE INVENTION

To address the above-discussed deficiencies of the prior art, it is a primary object of the present invention to provide, for use in a digital signal processor comprising a first instruction pipeline and a second instruction pipeline, an apparatus for managing vertical dependencies between instructions in the first and second instruction pipelines. To accomplish this, numerical identifiers (IDs) are assigned sequentially to the destination registers as they are dispatched to either of the first and second pipelines. Additionally, if an instruction about to enter a pipeline contains one dependent source operand that requires a result from a register ("the dependent source register") that is dependent on execution of a prior instruction still in one of the pipelines, the ID of the dependent source register is assigned to the dependent source operand. If an instruction about to enter a pipeline contains two dependent source operands that require results from two dependent source registers, the ID of the dependent source register that is younger (i.e., most recently sent into pipelines) is assigned to the corresponding one of the two dependent source operands.

At the end of the instruction pipelines, the identifiers of executed (or retired) instructions are reclaimed. The present invention tracks a sequential list of retired IDs in order to determine the next sequential ID to be retired (referred to as "next retire ID"). A dispatched instruction from either pipeline is scheduled for execution by comparing the identifier associated with the source operands in the dispatched instruction with the next retire ID. If the dispatched instruction contains only one dependent source operand, the ID of the dependent source register is compared to next retire ID. If the dispatched instruction contains two dependent source operands, the previously determined younger ID assigned to one of the dependent source operands is compared to next retire ID. The dispatched instruction is scheduled for instruction only if the dependent source operand ID is less than of equal to the next retire ID.

In an exemplary embodiment, the first and second instruction pipelines comprise an instruction fetch stage, a decode stage, a dispatch stage, a schedule stage, an execution stage, and a retire stage. According to an advantageous embodiment of the present invention, the apparatus for managing vertical dependencies between instructions in the first and second instruction pipelines comprises: 1) identifier (ID) reclaim circuitry capable of determining a sequential set of retired identifiers associated with retired instructions executed by the first and second instruction pipelines, wherein the ID reclaim circuitry is further capable of determining a next retire ID sequentially following the sequentially set of retired identifiers; 2) first ID generation circuitry capable of sequentially assigning identifiers to destination registers associated with instructions entering the first and second instruction pipelines; 3) second ID generation circuitry associated with the first instruction pipeline capable of identifying a first dependent source register associated with a first dependent source operand of a first instruction entering the first instruction pipeline, and assigning an ID of the first dependent source register to the first dependent source operand; and 4) instruction scheduling circuitry capable of comparing the first dependent source operand ID of the first instruction with the next retire ID and scheduling the first instruction for execution if the first dependent source operand ID is one of: 1) less than the next retire ID and 2) equal to the next retire ID.

According to one embodiment of the present invention, the second ID generation circuitry is further capable of identifying a second dependent source register associated with a second dependent source operand of the first instruction, comparing an ID of the second dependent source register with the first dependent source register ID to determine a first younger ID and assigning the first younger ID to a corresponding one of the first dependent source operand and the second dependent source operand.

According to another embodiment of the present invention, the instruction scheduling circuitry is further capable of comparing the first younger ID associated with the corresponding one of the first and second dependent source operands with the next retire ID and scheduling the first instruction for execution if the first younger ID is one of: 1) less than the next retire ID and 2) equal to the next retire ID.

According to still another embodiment of the present invention, the apparatus for managing vertical dependencies further comprises third ID generation circuitry associated with the second instruction pipeline capable of identifying a third dependent source register associated with a third dependent source operand of a second instruction entering the second instruction pipeline, and assigning an ID of the third dependent source register to the third dependent source operand.

According to yet another embodiment of the present invention, the third ID generation circuitry is further capable of identifying a fourth dependent source register associated with a fourth dependent source operand of the second instruction, comparing an ID of the fourth dependent source register with the third dependent source register ID to determine a second younger ID and assigning the second younger ID to a corresponding one of the third dependent source operand and the fourth dependent source operand.

According to a further embodiment of the present invention, the instruction scheduling circuitry is further capable of comparing the second younger ID associated with the corresponding one of the third and fourth dependent source operands with the next retire ID and scheduling the second instruction for execution if the second younger ID is one of: 1) less than the next retire ID and 2) equal to the next retire ID.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital signal processor.

Figure 1A:
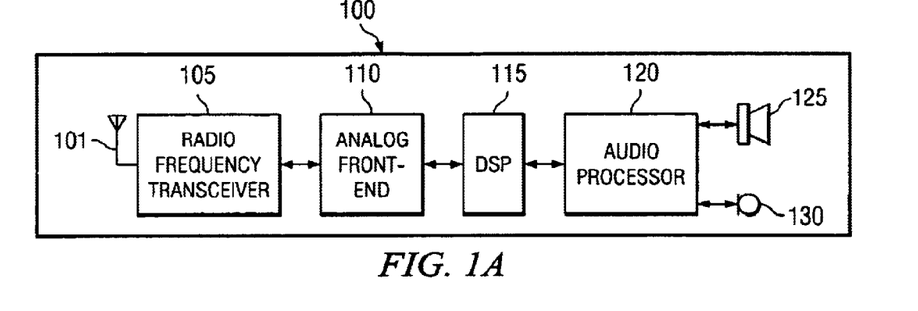
FIG. 1A illustrates an exemplary mobile phone according to one embodiment of the present invention.

FIG. 1A illustrates exemplary mobile phone 100 according to one embodiment of the present invention. Mobile phone 100 comprises antenna 101, radio frequency (RF) transceiver (X-CVR) 105, analog front-end circuitry 110, digital signal processor 115, audio processor 120, speaker (SPKR) 125, and microphone (MIC) 130. In the inbound (or receive) signal path, RF transceiver 105 contains circuitry, such as a low noise amplifier (LNA) and an RF mixer, that amplifies an incoming RF signal detected by antenna 101 and down-converts the amplified RF signal to, for example, an intermediate frequency (IF) signal. Analog front-end circuitry 110 filters and further down-converts the IF signal to produce a digital input data stream that is input to digital signal processor (DSP) 115. DSP 115 performs any necessary decoding of the digital input data stream and outputs an analog baseband signal that is transmitted to audio processor 120. Audio processor 120 filters and amplifies the analog baseband signal to generate an audio signal that drives speaker 125.

In the outbound (or transmit) signal path, audio processor amplifies and filters a voice signal detected by microphone 130. DSP 115 digitizes and encodes the outbound baseband analog signal generated by audio processor 120 to produce an outbound digital baseband signal. Analog front-end circuitry 160 then amplifies and up-converts the outbound digital baseband signal to produce an outbound IF signal. The IF signal is then up-converted to an output RF signal by RF transceiver 105. RF transceiver 105 then amplifies the output RF signal to an appropriate level to drive antenna 101.

Figure 1B:
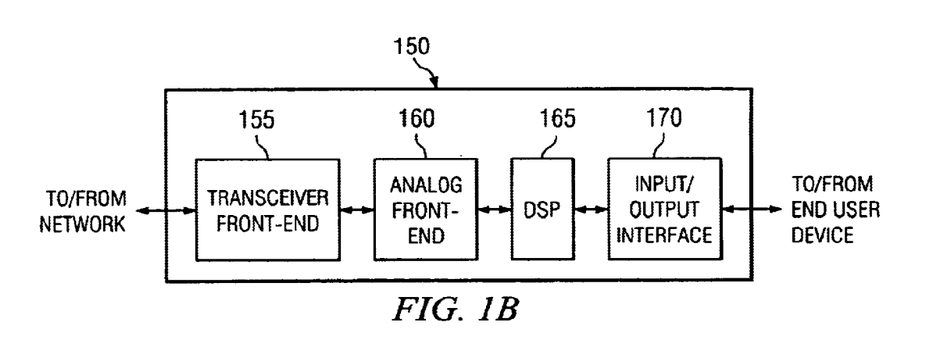
FIG. 1B illustrates an exemplary wireline communication device according to one embodiment of the present invention.

FIG. 1B illustrates exemplary wireline communication device 150 according to one embodiment of the present invention. Wireline communication device 150 may be a standard V.90 (i.e., 56K) modem, a cable modem, a 10Base-T, 100Base-T, or 1000Base-T local area network (LAN) card, a DSL card, or the like. Wireline communication device 150 comprises transceiver (X-CVR) front-end circuitry 155, analog front-end circuitry 160, digital signal processor 165, and input-output (IF) interface circuitry 170. In the inbound (or receive) signal path, transceiver front-end circuitry 155 contains circuitry that amplifies an incoming signal received from an external communication line, such as a television cable, a phone line or a local area network wire. The incoming signal is a high-frequency modulated signal, including perhaps an RF signal, and down-converts the modulated signal to, for example, an intermediate frequency (IF) signal. Analog front-end circuitry 160 filters out the frequencies of interest and further down-converts the IF signal to produce a digital input data stream that is input to digital signal processor (DSP) 165. DSP 165 performs any necessary decoding of the digital input data stream and outputs a digital baseband signal that is transmitted to I/O interface circuitry 170. I/O interface circuitry 170 buffers the digital baseband signal and transmits the received digital data to a connected end-user device (e.g., personal computer (PC), cable converter set-top box, network device).

In the outbound (or transmit) signal path, I/O interface circuitry 170 receives and buffers outbound baseband digital data from the end-user device. I/O interface circuitry 170 transmits the outbound baseband digital data to DSP 115, which encodes the outbound baseband analog signal to produce an outbound digital data stream. Analog front-end circuitry 160 then amplifies and up-converts the outbound digital data stream to produce an outbound IF signal. Transceiver front-end circuitry 155 receives the IF signal and further up-converts it to produce a modulated output high-frequency signal.

According to an advantageous embodiment of the present invention, DSP 115 and DSP 165 are super-scalar DSP architectures that have more than one instruction pipeline. In the embodiments described below in FIGS. 2 through 7, it will be assumed that DSP 115 and DSP 165 contain two instruction pipelines. However, it should be understood that this is by way of example only and that principles of the present invention disclosed hereafter may readily be adapted for implementation in digital signal processors having three or more instruction pipelines.

Figure 2:
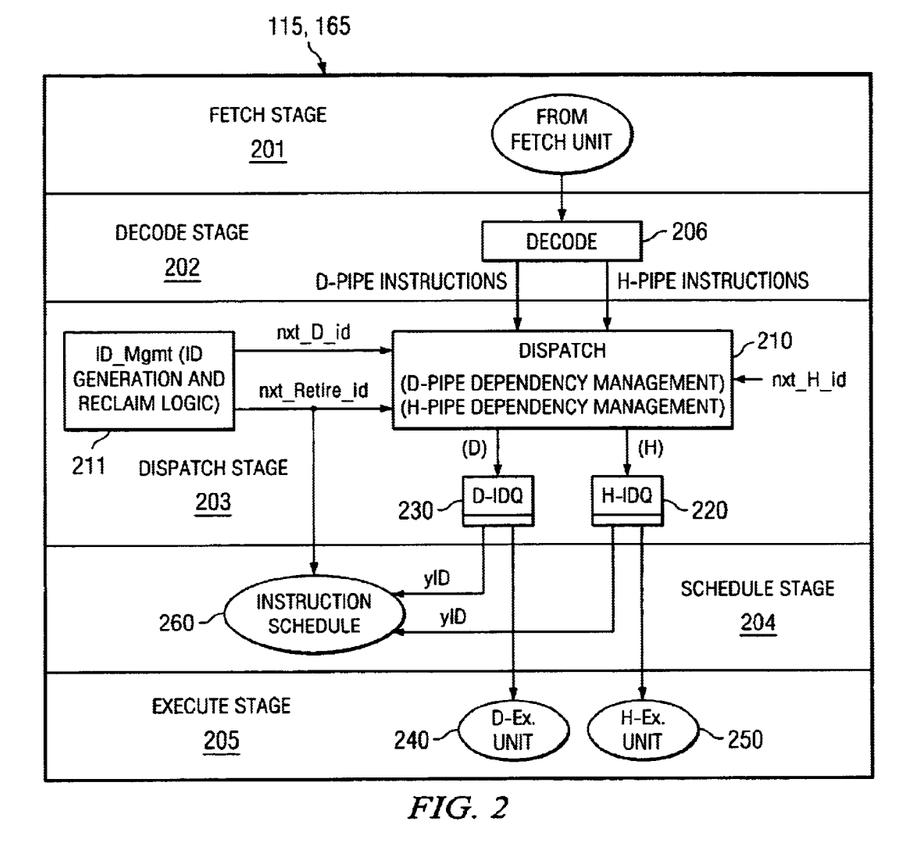
FIG. 2 illustrates selected portions of the dual instruction pipeline and associated dependency management circuitry in the exemplary DSP according to one embodiment of the present invention.

FIG. 2 illustrates selected portions of the dual instruction pipeline and associated dependency management circuitry in exemplary DSP 115 and exemplary DSP 165 (hereafter, simply DSP 115) according to one embodiment of the present invention. As noted above, DSP 115 is a 2-way super-scalar architecture in which instructions are issued in order and may be executed out-of-order, and in which results may be written to the register file out-of-order. However, DSP 115 retires instructions in order.

In an exemplary embodiment of the present invention, DSP 115 comprises the following:

(1) sixteen 40-bit orthogonal data registers for fractional and integer data operand storage, referred to as Rx (i.e., R0 through R15);

(2) sixteen 32-bit address registers for address calculation, referred to as Px (i.e., P0 through P15);

(3) sixteen 1-bit guard registers for predicated execution, referred to as Gx (i.e., G0 through G15);

(4) sixteen 32-bit control registers for hardware loop control, referred to as Cx (i.e., C0 through C15).

(5) a data pipeline (referred to as "D-Pipe") that includes its own instruction queue (referred to as "D-IDQ 230") and execution data path capable of executing instructions that use Rx as a destination. The exceptions to this rule are LOAD instructions that use Rx as a destination. These go to the H-Pipe.

(6) a hybrid pipeline (referred to as "H-Pipe") that includes its own instruction queue (referred to as "H-IDQ 220") and execution data path capable of executing load/store instructions, branch instructions, and all instructions with destination as Px or Cx.

DSP 115 comprises fetch stage 201, decode stage 202, dispatch stage 203, schedule stage 204, execute stage 205, and a retire stage that comprises, in part, ID management control logic 211. The present invention is implemented in dispatch stage 203, schedule stage 204 and the retire stage. Fetch stage 201 comprises a fetch unit and associated logic circuitry that fetch instructions into decode unit 206 in decode stage 202. Decode unit 206 decodes the fetched instructions and sends them to dispatch logic 210 in dispatch 203 as either D-Pipe instructions or H-Pipe instructions, as explained below in greater detail. The invention allows dispatch logic 210 to track the vertical dependencies between instructions efficiently and to generate dependency information for scheduling. The dependency information is minimal and enables efficient scheduling.

Load instructions are pipelined and are allowed to proceed for execution as long as the address operands are available. Load instructions return data in order and can bypass their results to dependent instructions. Dispatch logic 210 dispatches one or two instructions to D-IDQ 230 or H-IDQ 220, or one instruction each to D-IDQ 230 and H-IDQ 220. Instruction schedule logic 260 schedules instructions out of D-IDQ 230 and H-IDQ 220 in order. Up to two instructions, one from D-IDQ 230 and one from H-IDQ 220, can be scheduled for execution in D-execution unit 240 and H-execution unit 250. This in effect enables instructions to execute out-of-order and improves performance.

ID management control logic 211 assigns each instruction entering dispatch stage 203 an identifier (referred to by signal name "nxt_D_ID"). ID management control logic 211 also reclaims retired identifiers (IDs) from the retire stage after an instruction has been executed. IDs are assigned and reclaimed in sequential order. The retire stage broadcasts the next ID to be retired (referred to by the value/signal name "nxt_Retire_ID") and can reclaim as many IDs as defined by a particular digital signal processor architecture. An ID is reclaimed by the retire stage only after all older IDs have completed execution. More than one ID can potentially be reclaimed and the number of IDs reclaimed per cycle depends on the implementation.

Instructions can have several source operands. For an instruction to be ready for scheduling, it is imperative that all its source operands are available. Ideally, if the source operand is not ready, the ID of the instruction producing the source operand should be known to DSP 115. This would require an ID for each source operand to determine if the instruction is ready for scheduling. However, the exemplary architecture allows for up to four source operands. This would not be an efficient solution since the queues would be wider and more logic would be needed to determine the ready state of the instruction.

The present invention takes advantage of the fact that instructions are retired in order. It is therefore necessary only to know the youngest of all the source operand-dependent IDs. The youngest source operand-dependent ID is referred to by the value/signal name "yID" hereafter. Since IDs are issued in sequential order (i.e., from 000 to 111) to the destination registers in the instructions, the youngest ID is the highest numerical value (e.g., 101 is younger than 011). Using yID values, scheduling simply amounts to an age comparison operation to determine if yID is older than the nxt_Retire_ID value. If yID is older than the next_Retire_ID value, the instruction associated with yID cannot be executed. Instruction schedule logic 260 compares the yID of an instruction from D-IDQ 230 and the yID of an instruction from H-IDQ 220 with the next_Retire-ID value.

DSP 115 generates ID values at dispatch stage 203. In an exemplary embodiment of the present invention, an ID comprises a "color" bit field, a "valid" bit field, and a three bit binary number (i.e., 000 to 111), all of which are used to perform an age comparison operation. The color bit of an ID is a prefix bit that toggles every time the three-bit binary number wraps around (or rolls over) Thus, the ID dispatched after 111 is 000, but with a different (i.e., toggled) color bit.

yID Generation

The value yID is computed by dispatch stage 203 for instructions entering D-IDQ 230 and H-IDQ 220. In order to explain the state information that is held at dispatch stage 203, it is essential to define a few data types. Also, the terms "dependency check" and "hazard check" may be used interchangeably hereafter. The generation of yID in D-IDQ 230 and the generation of yID in H-IDQ 220 are identical in concept. To avoid redundant explanation, duplication, only D-IDQ 230 yID generation is described in the following sections.

FIGS. 3–7 illustrate selected portions of dispatch logic 210 in the exemplary dependency management circuitry in greater detail according to one embodiment of the present invention. Generation of yID in D-IDQ 230 requires the following inputs:

a. Decoded D-Pipe instruction from decode stage 202 containing the following fields:
 1. Inst.Source.Rx_Reg#—shown as input 320 in FIG. 3. This is the instruction source Rx register# and accounts for three possible sources.
 2. Inst.Source.Gx_Reg#—shown as input 322 in FIG. 3. This is the instruction source Gx register#.
 3. Inst.Sources.Rx—shown in block 321 of FIG. 3. This is a state bit that indicates if the instruction source is any of registers R0 through R15.
 4. Inst.Sources.Px—shown in block 321 of FIG. 3. This is a state bit that indicates if the instruction source is any of registers P0 through P15.
 5. Inst.Sources.Gx—shown in block 321 of FIG. 3. This is a state bit that indicates if the instruction source is any of registers G0 through G15.
 6. Inst.Sources.Cx—shown in block 321 of FIG. 3. This is a state bit that indicates if the instruction source is any of registers C0 through C15.
 7. Inst.Destination.Rx—shown in block 323 of FIG. 3. This is a state bit that indicates if the instruction destination is any of registers R0 through R15.
 8. Inst.Destination.Gx—shown in block 323 of FIG. 3. This is a state bit that indicates if the instruction destination is any of registers G0 through G15.
b. nxt_H_ID, nxt_D_ID, nxt_Retire_ID values from ID management control logic 211 of FIG. 2.

Figure 3:
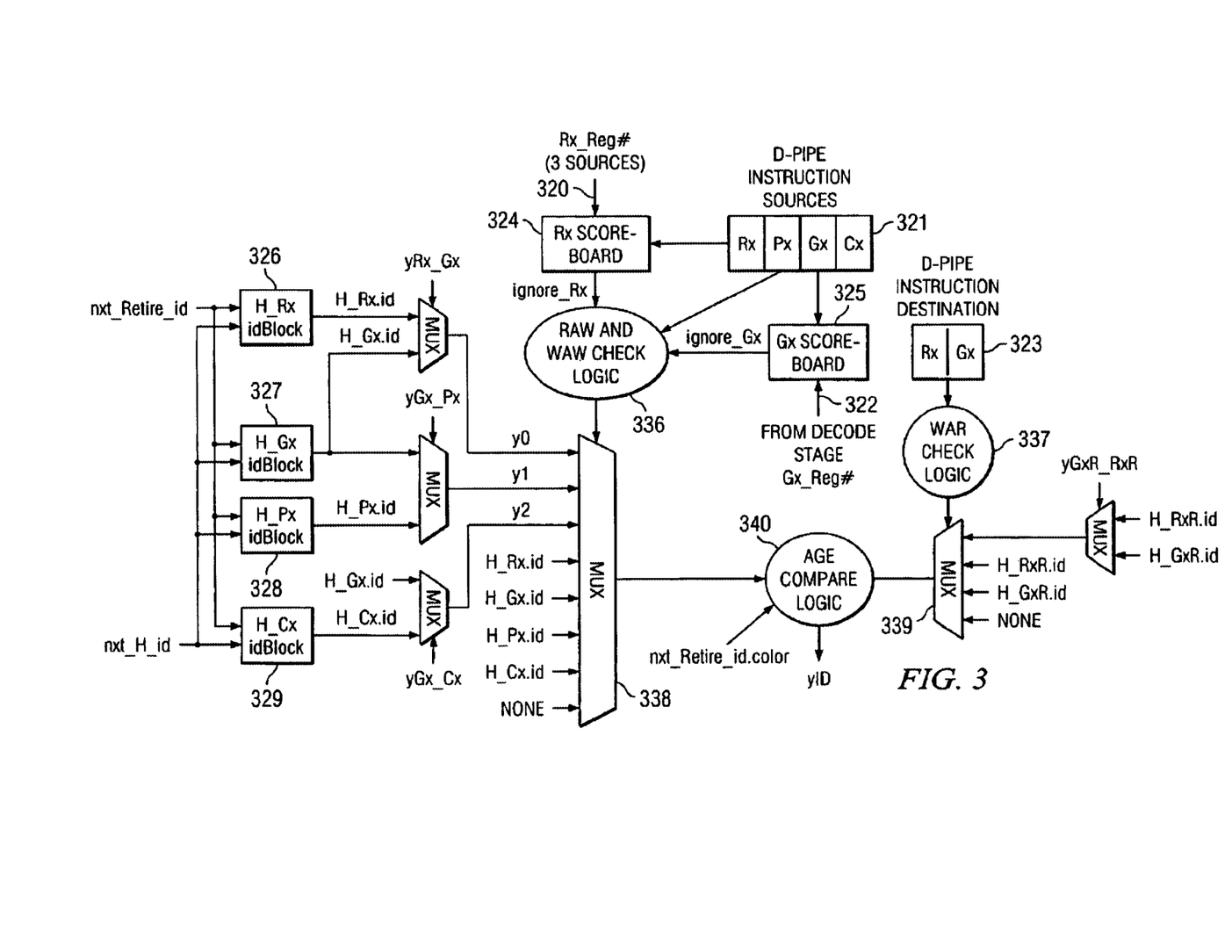
FIG. 3 illustrates selected portions of the dispatch logic in the exemplary dependency management circuitry in greater detail according to one embodiment of the present invention.
Figure 6:
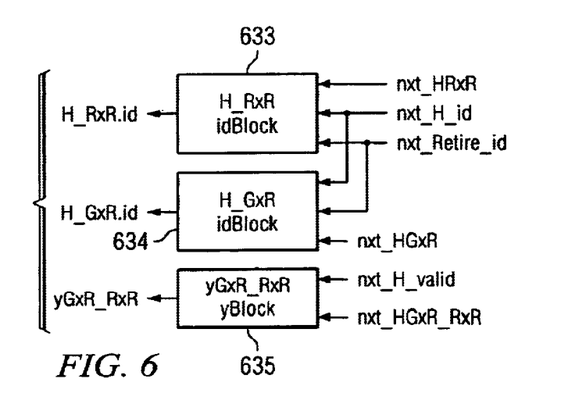
FIG. 6 illustrates selected portions of the exemplary dependency management circuitry in greater detail according to one embodiment of the present invention.

The following state information values are generated in dispatch logic 230 for D-IDQ 230 yID generation:

a. H_Rx.ID—output of H_Rx IDBlock 326 of FIG. 3—This value indicates the ID of the most recent instruction dispatched to H-IDQ 220 with Rx (any of registers R0 through R15) as the destination.
b. H_Gx.ID—output of H_Gx IDBlock 327 of FIG. 3—This value indicates the ID of the most recent instruction dispatched to H-IDQ 220 with Gx (any of registers G0 through G15) as the destination.
c. H Px.ID—output of H Px IDBlock 328 of FIG. 3—This value indicates the ID of the most recent instruction dispatched to H-IDQ 220 with Px (any of registers P0 through P15) as the destination.
d. H Cx.ID—output of H Cx.IDBlock 329 of FIG. 3—This value indicates the ID of the most recent instruction dispatched to H-IDQ 220 with Cx (any of registers C0 through C15) as the destination.
e. yRx_Gx—output of yRx_Gx yBlock 430 of FIG. 4—This value indicates which one of H_Rx.ID and H_Gx.ID is younger.
f. yGx_Px—output of yGx_Px yBlock 431 of FIG. 4—This value indicates which one of H_Gx.ID and H_Px.ID is younger.
g. yGx_Cx—output of yGx_Cx yBlock 432 of FIG. 4—This value indicates which one of H_Gx.ID and H_Cx.ID is younger.
h. H_RxR.ID—output of H_RxR IDBlock 633 of FIG. 6—This holds the ID of the most recent instruction dispatched to H-IDQ 220 with Rx (any of registers R0 through R15) as the source.
i. H_GxR.ID—output of H_GxR IDBlock 634 of FIG. 6—This holds the ID of the most recent instruction dispatched to H-IDQ 220 with Gx (any of registers G0 through G15) as the source.

j. yGxR_RxR—output of yGxR_RxR yBlock 635 of FIG. 6—This value indicates which one of H_RxR.ID and H_GxR.ID is younger.

The values described above are used by the hazard (or dependency) check logic. The present invention checks for three types of hazards: read-after-write (RAW), write-after-write (WAW) and write-after-read (WAR). RAW & WAW check logic 336 in FIG. 3 checks for RAW hazards (dependencies) and WAW hazards (dependencies), while WAR check logic 337 checks for WAR hazards (dependencies).

RAW & WAW Check Logic 336

RAW & WAW check logic 336 generates the multiplexer (MUX) control signals for MUX 338 of FIG. 3. RAW & WAW check logic 336 takes into account the fact that the architecture of DSP 115 permits only the following combinations of instruction sources:

a. Inst.Sources.Rx only
b. Inst.Sources.Gx only
c. Inst.Sources.Px only
d. Inst.Sources.Cx only
e. Inst.Sources.Gx and Inst.Sources.Rx
f. Inst.Sources.Gx and Inst.Sources.Px
e. Inst.Sources.Gx and Inst.Sources.Cx The logic definition for RAW & WAW check logic 336 is the following priority expression:

```
                                            // WAW Check
dependsOnGx = (Inst.Sources.Gx || Inst.Dest.Gx);
                                            // WAW Check
dependsOnRx = (Inst.Sources.Rx || Inst.Dest.Rx);
if (dependsOnGx && dependsRx)
    sel = y0;          // younger of (H_Rx.ID, H_Gx.ID)
else if (dependsOnGx && Inst.Sources.Px)
    sel = y1;          // younger of (H_Px.ID, H_Gx.ID)
else if (dependsOnGx && Inst.Sources.Cx)
    sel = y2;          // younger of (H_Cx.ID, H_Gx.ID)
else if (dependsOnRx)
    sel = H_Rx.ID;
else if (dependsOnGx)
    sel = H_Gx.ID;
else if (Inst.Sources.Px)
    sel = H_Px.ID;
else if (Inst.Sources.Cx)
    sel = H_Cx.ID;
else
    sel = None.
```

[Expression 1]

The term "sel" indicates the selected MUX 338 input channel. EXPRESSION 1 above could lead to false dependencies since the checks are done for the entire set Rx (R0 through R15) or Gx (G0 through G15). In one embodiment of the present invention, DSP 115 frequently uses Rx and Gx. This may create a comparatively large number of false dependencies. The present invention uses Rx scoreboard 324 and Gx scoreboard 325 in FIG. 3 to prevent false dependencies. Rx scoreboard 324 and Gx scoreboard 325 are shown in greater detail in FIG. 7.

Rx scoreboard 324 is a 16×1 register that represents the availability of registers R0 through R15. Gx scoreboard 325 is a 16×1 register that represents the availability of registers G0 through G15. A "set" bit indicates that a particular register is in use in H-IDQ 220 and a clear bit indicates otherwise. As mentioned earlier, an instruction can have three sources for Rx. The status of Rx scoreboard 324 is examined for all the three sources and the signal "ignore_Rx" is set to a Logic 1 by three AND gates and a NOR gate coupled to the outputs of Rx scoreboard 324 only if all the three sources have their corresponding bits reset in the scoreboard. Gx scoreboard 325 operates in a similar fashion with limited inputs as defined by the architecture of DSP 115. The signal "ignore_Gx" is set to a Logic 1 by two AND gates and a NOR gate coupled to the outputs of Gx scoreboard 325 only if the two sources for Gx have their corresponding bits reset in the scoreboard.

Using the signals ignore_Rx and ignore_Gx, false dependencies are reduced and the first portions of EXPRESSION 1 becomes:

```
                                                    // WAW Check
dependsOnGx = (Inst.Sources.Gx || Inst.Dest.Gx) && !ignore_Gx;
                                                    // WAW Check
dependsOnRx = (Inst.Sources.Rx || Inst.Dest.Rx) && !ignore_Rx;
```

The rest of EXPRESSION 1 is the same as above. This logic clearly produces yID based on a hazard check by RAW & WAW check logic 336.

WAR Check Logic 337

DSP 115 requires that a D-IDQ 230 instruction does not write to a destination register before it is read as a source by the instruction in H-IDQ 220. D-IDQ 230 can have the following destination sets:

a. Rx Only
b. Gx Only
c. Gx and Rx.
d. None (for a store data instruction)

The logic expression for WAR check logic 337 is given by:

if (Inst.Dest.Rx && Inst.Dest.Gx)
 sel=x0; // younger of (H_RxR.ID, H_GxR.ID) from MUX 339 in FIG. 3
else if (Inst.Dest.Rx)
 sel=H_RxR.ID;
else if (Inst.Dest.Gx)
 sel=H_GxR.ID;
else
 sel=None.

Expression 2

Expression 2 produces yID for WAR hazards.

Final yID Generation

Age compare logic 340 in FIG. 3 takes the yID value from RAW & WAW check logic 336, the yID value from WAR check logic 337, and the color bit of the nxt_Retire_ID value, and performs an age comparison in order to generate the final yID value.

Detailed Description of Idblock State Management

Each of the IDBlocks in FIG. 3 (i.e., blocks 326, 327, 328, and 329) holds the most recent ID of the youngest instruction sent to H-IDQ 220 with a certain requirements. For example, H_Rx IDBlock 326 holds the ID of the youngest instruction sent to H-IDQ 220 with Rx as destination. H_Rx IDBlock 326 gets updated every cycle for two reasons:

a. The instruction being dispatched to H-IDQ 220 has Rx as its destination; and
b. The nxt_Retire_ID value indicates that the current ID stored in the block is already retired and no longer valid.

Figure 5:
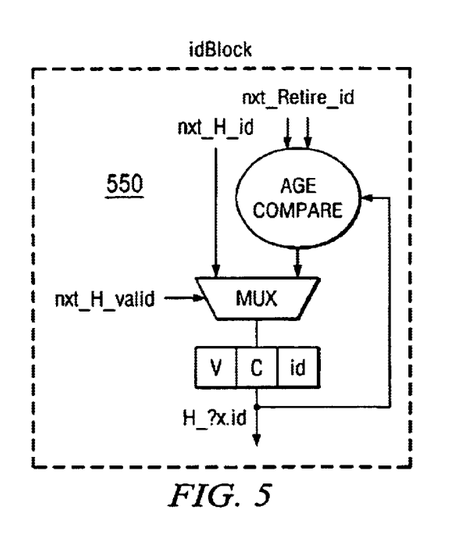
FIG. 5 illustrates selected portions of the exemplary dependency management circuitry in greater detail according to one embodiment of the present invention.

This is illustrated by exemplary IDBlock 550 in FIG. 5. The nxt_H_valid signal for H_Rx IDBlock 326 indicates whether the next instruction to enter H-IDQ 220 has Rx as its destination. The age comparison logic in IDBlock 550 determines if the current ID is retired.

Detailed Description of yblock State Management

Figure 4:
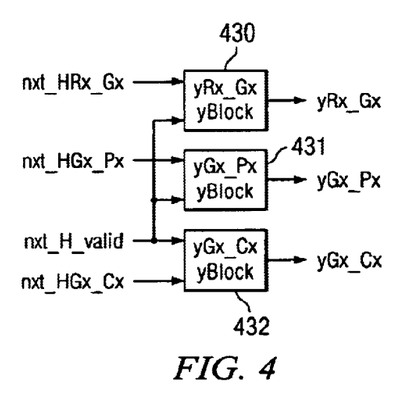
FIG. 4 illustrates selected portions of the exemplary dependency management circuitry in greater detail according to one embodiment of the present invention.

The "generic" form of a yBlock can be denoted by the output signal "yAx_Bx." The yAx_Bx value is set if the next instruction being sent to H-IDQ 220 updates Ax or Bx. For example, the yRx_Gx output of YRx_Gx yBlock 430 is set if the next instruction being sent to H-IDQ 220 updates either an Rx register or a Gx register. This is controlled by the signal nxt_HRx_Gx generated by decode logic 206.

Detailed Description of Scoreboard State Management

Figure 7:
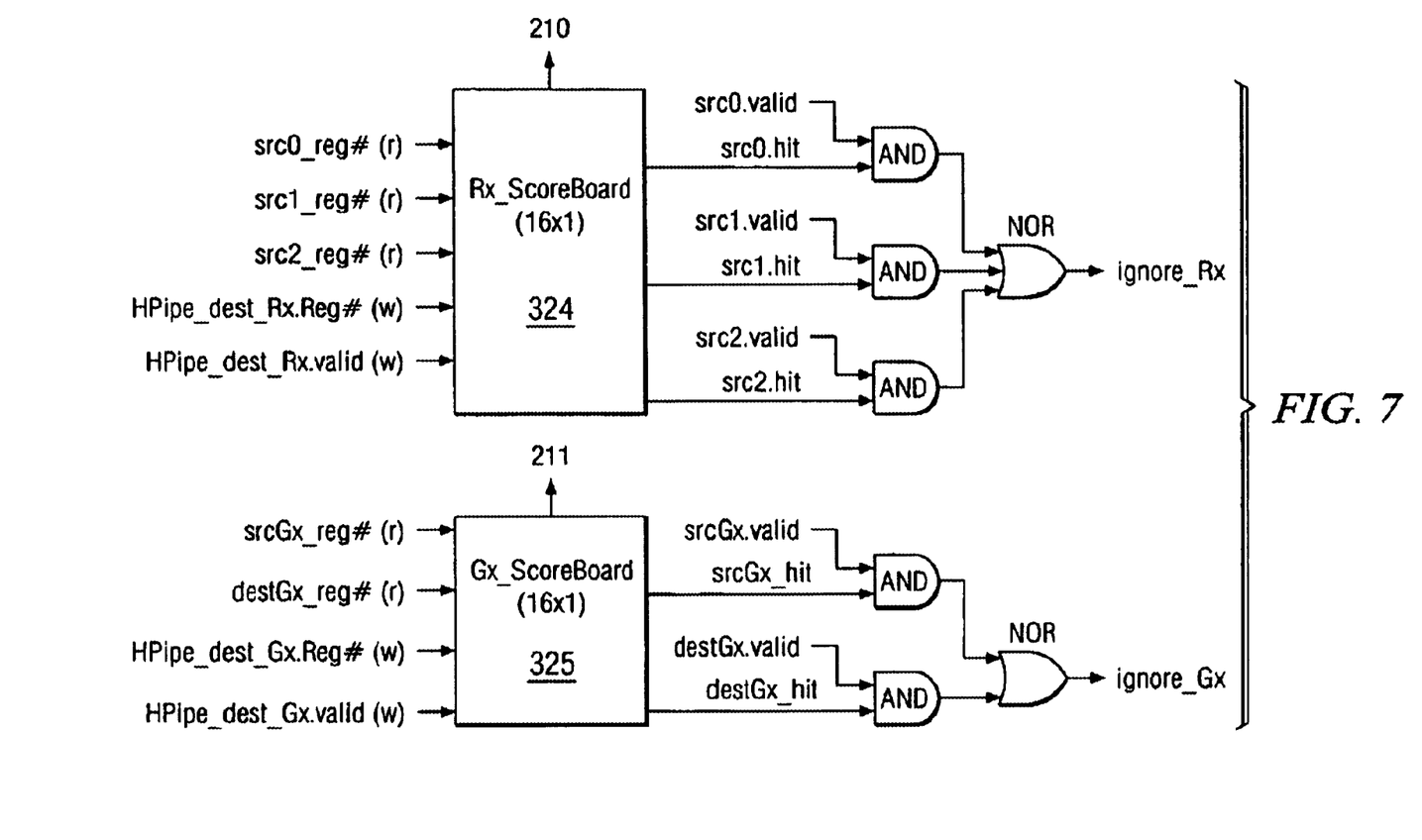
FIG. 7 illustrates selected portions of the exemplary dependency management circuitry in greater detail according to one embodiment of the present invention.

Rx scoreboard 324 may be updated for two conditions:
a. A set scoreboard status for a D-IDQ 230 instruction source results in an automatic reset. This is done to ensure that a subsequent instruction does not see the dependency. Since a D-IDQ 230 instruction potentially may have three sources, this logic is applicable for all three sources; and
b. The scoreboard bit corresponding to an H-IDQ 220 destination Rx register is set if the H-IDQ 220 destination is indeed the Rx register. The corresponding logic is illustrated in FIG. 7. Condition (b) overrides condition (a) if the Rx# is the same for (a) and (b). Updates to Gx scoreboard 325 are done in a similar way.

The present invention provides a unique apparatus and method for managing vertical dependencies in a digital signal processor. The present invention generates a yID value to determine the younger state information and couples the younger state information with scoreboarding in order to reduce false dependencies. The scoreboard data updates on lookup to eliminate subsequent false dependencies as detailed above. Updating younger state information every cycle avoids several age comparisons which otherwise would be required.

Although the present invention has been described in detail, those skilled in the art should understand that they can make various changes, substitutions and alterations herein without departing from the spirit and scope of the invention in its broadest form.

What is claimed is:

1. For use in a digital signal processor comprising a first instruction pipeline and a second instruction pipeline, said first and second instruction pipelines comprising an instruction fetch stage, a decode stage, a dispatch stage, a schedule stage, an execution stage, and a retire stage, an apparatus for managing vertical dependencies between instructions in said first and second instruction pipelines comprising:
   identifier (ID) reclaim circuitry capable of determining a sequential set of retired identifiers associated with retired instructions executed by said first and second instruction pipelines, wherein said ID reclaim circuitry is further capable of determining a next retire ID sequentially following said sequential set of retired identifiers;
   first ID generation circuitry capable of sequentially assigning identifiers to destination registers associated with instructions entering said first and second instruction pipelines;
   second ID generation circuitry associated with said first instruction pipeline capable of identifying a first dependent source register associated with a first dependent source operand of a first instruction entering said first instruction pipeline, and assigning an ID of said first dependent source register to said first dependent source operand; and
   instruction scheduling circuitry capable of comparing said first dependent source operand ID of said first instruction with said next retire ID and scheduling said first instruction for execution if said first dependent source operand ID is one of: 1) less than said next retire ID and 2) equal to said next retire ID.

2. The apparatus for managing vertical dependencies as set forth in claim 1 wherein said second ID generation circuitry is further capable of identifying a second dependent source register associated with a second dependent source operand of said first instruction, comparing an ID of said second dependent source register with said first dependent source register ID to determine a first younger ID and assigning said first younger ID to a corresponding one of said first dependent source operand and said second dependent source operand.

3. The apparatus for managing vertical dependencies as set forth in claim 2 wherein said instruction scheduling circuitry is further capable of comparing said first younger ID associated with said corresponding one of said first and second dependent source operands with said next retire ID and scheduling said first instruction for execution if said first younger ID is one of: 1) less than said next retire ID and 2) equal to said next retire ID.

4. The apparatus for managing vertical dependencies as set forth in claim 3 further comprising third ID generation circuitry associated with said second instruction pipeline capable of identifying a third dependent source register associated with a third dependent source operand of a second instruction entering said second instruction pipeline, and assigning an ID of said third dependent source register to said third dependent source operand.

5. The apparatus for managing vertical dependencies as set forth in claim 4 wherein said third ID generation circuitry is further capable of identifying a fourth dependent source register associated with a fourth dependent source operand of said second instruction, comparing an ID of said fourth dependent source register with said third dependent source register ID to determine a second younger ID and assigning said second younger ID to a corresponding one of said third dependent source operand and said fourth dependent source operand.

6. The apparatus for managing vertical dependencies as set forth in claim 5 wherein said instruction scheduling circuitry is further capable of comparing said second younger ID associated with said corresponding one of said third and fourth dependent source operands with said next retire ID and scheduling said second instruction for execution if said second younger ID is one of: 1) less than said next retire ID and 2) equal to said next retire ID.

7. A digital signal processor comprising:
   a first instruction pipeline and a second instruction pipeline, said first and second instruction pipelines comprising:
   an instruction fetch stage;
   a decode stage;

a dispatch stage;
a schedule stage;
an execution stage; and
a retire stage; and
an apparatus for managing vertical dependencies between instructions in said first and second instruction pipelines comprising:
identifier (ID) reclaim circuitry capable of determining a sequential set of retired identifiers associated with retired instructions executed by said first and second instruction pipelines, wherein said ID reclaim circuitry is further capable of determining a next retire ID sequentially following said sequential set of retired identifiers;
first ID generation circuitry capable of sequentially assigning identifiers to destination registers associated with instructions entering said first and second instruction pipelines;
second ID generation circuitry associated with said first instruction pipeline capable of identifying a first dependent source register associated with a first dependent source operand of a first instruction entering said first instruction pipeline, and assigning an ID of said first dependent source register to said first dependent source operand; and
instruction scheduling circuitry capable of comparing said first dependent source operand ID of said first instruction with said next retire ID and scheduling said first instruction for execution if said first dependent source operand ID is one of: 1) less than said next retire ID and 2) equal to said next retire ID.

8. The digital signal processor as set forth in claim 7 wherein said second ID generation circuitry is further capable of identifying a second dependent source register associated with a second dependent source operand of said first instruction, comparing an ID of said second dependent source register with said first dependent source register ID to determine a first younger ID and assigning said first younger ID to a corresponding one of said first dependent source operand and said second dependent source operand.

9. The digital signal processor as set forth in claim 8 wherein said instruction scheduling circuitry is further capable of comparing said first younger ID associated with said corresponding one of said first and second dependent source operands with said next retire ID and scheduling said first instruction for execution if said first younger ID is one of: 1) less than said next retire ID and 2) equal to said next retire ID.

10. The digital signal processor as set forth in claim 9 further comprising third ID generation circuitry associated with said second instruction pipeline capable of identifying a third dependent source register associated with a third dependent source operand of a second instruction entering said second instruction pipeline, and assigning an ID of said third dependent source register to said third dependent source operand.

11. The digital signal processor as set forth in claim 10 wherein said third ID generation circuitry is further capable of identifying a fourth dependent source register associated with a fourth dependent source operand of said second instruction, comparing an ID of said fourth dependent source register with said third dependent source register ID to determine a second younger ID and assigning said second younger ID to a corresponding one of said third dependent source operand and said fourth dependent source operand.

12. The digital signal processor as set forth in claim 11 wherein said instruction scheduling circuitry is further capable of comparing said second younger ID associated with said corresponding one of said third and fourth dependent source operands with said next retire ID and scheduling said second instruction for execution if said second younger ID is one of: 1) less than said next retire ID and 2) equal to said next retire ID.

13. A wireless communication device comprising:
a radio frequency(RF) transceiver capable of receiving an incoming RF signal and down-converting said incoming RF signal to an incoming intermediate frequency (IF) signal;
analog processing circuitry capable of receiving said incoming IF signal and down-converting said incoming IF signal to an incoming digital data stream; and
a digital signal processor comprising:
a first instruction pipeline and a second instruction pipeline, said first and second instruction pipelines comprising:
an instruction fetch stage;
a decode stage;
a dispatch stage;
a schedule stage;
an execution stage; and
a retire stage; and
an apparatus for managing vertical dependencies between instructions in said first and second instruction pipelines comprising:
identifier (ID) reclaim circuitry capable of determining a sequential set of retired identifiers associated with retired instructions executed by said first and second instruction pipelines, wherein said ID reclaim circuitry is further capable of determining a next retire ID sequentially following said sequential set of retired identifiers;
first ID generation circuitry capable of sequentially assigning identifiers to destination registers associated with instructions entering said first and second instruction pipelines;
second ID generation circuitry associated with said first instruction pipeline capable of identifying a first dependent source register associated with a first dependent source operand of a first instruction entering said first instruction pipeline, and assigning an ID of said first dependent source register to said first dependent source operand; and
instruction scheduling circuitry capable of comparing said first dependent source operand ID of said first instruction with said next retire ID and scheduling said first instruction for execution if said first dependent source operand ID is one of: 1) less than said next retire ID and 2) equal to said next retire ID.

14. The wireless communication device as set forth in claim 13 wherein said second ID generation circuitry is further capable of identifying a second dependent source register associated with a second dependent source operand of said first instruction, comparing an ID of said second dependent source register with said first dependent source register ID to determine a first younger ID and assigning said first younger ID to a corresponding one of said first dependent source operand and said second dependent source operand.

15. The wireless communication device as set forth in claim 14 wherein said instruction scheduling circuitry is further capable of comparing said first younger ID associated with said corresponding one of said first and second dependent source operands with said next retire ID and scheduling said first instruction for execution if said first younger ID is one of: 1) less than said next retire ID and 2) equal to said next retire ID.

16. The wireless communication device as set forth in claim 15 further comprising third ID generation circuitry associated with said second instruction pipeline capable of identifying a third dependent source register associated with a third dependent source operand of a second instruction entering said second instruction pipeline, and assigning an ID of said third dependent source register to said third dependent source operand.

17. The wireless communication device as set forth in claim 16 wherein said third ID generation circuitry is further capable of identifying a fourth dependent source register associated with a fourth dependent source operand of said second instruction, comparing an ID of said fourth dependent source register with said third dependent source register ID to determine a second younger ID and assigning said second younger ID to a corresponding one of said third dependent source operand and said fourth dependent source operand.

18. The wireless communication device as set forth in claim 17 wherein said instruction scheduling circuitry is further capable of comparing said second younger ID associated with said corresponding one of said third and fourth dependent source operands with said next retire ID and scheduling said second instruction for execution if said second younger ID is one of: 1) less than said next retire ID and 2) equal to said next retire ID.

19. For use in a digital signal processor comprising a first instruction pipeline and a second instruction pipeline, the first and second instruction pipelines comprising an instruction fetch stage, a decode stage, a dispatch stage, a schedule stage, an execution stage, and a retire stage, a method of managing vertical dependencies between instructions in the first and second instruction pipelines comprising the steps of:

determining a sequential set of retired identifiers associated with retired instructions executed by the first and second instruction pipelines;

determining a next retire ID sequentially following the sequential set of retired identifiers;

sequentially assigning identifiers to destination registers associated with instructions entering the first and second instruction pipelines;

identifying a first dependent source register associated with a first dependent source operand of a first instruction entering the first instruction pipeline and assigning an ID of the first dependent source register to the first dependent source operand;

comparing the first dependent source operand ID of the first instruction with the next retire ID; and scheduling the first instruction for execution if the first dependent source operand ID is one of: 1) less than the next retire ID and 2) equal to the next retire ID.

20. The method as set forth in claim 19 further comprising the steps of:

identifying a second dependent source register associated with a second dependent source operand of the first instruction;

comparing an ID of the second dependent source register with the first dependent source register ID to determine a first younger ID; and assigning the first younger ID to a corresponding one of the first dependent source operand and the second dependent source operand.

21. The method as set forth in claim 19 further comprising the steps of:

comparing the first younger ID associated with the corresponding one of the first and second dependent source operands with the next retire ID; and scheduling the first instruction for execution if the first younger ID is one of: 1) less than the next retire ID and 2) equal to the next retire ID.

22. The method as set forth in claim 21 further comprising the steps of:

identifying a third dependent source register associated with a third dependent source operand of a second instruction entering the second instruction pipeline; and assigning an ID of the third dependent source register to the third dependent source operand.

23. The method as set forth in claim 22 further comprising the steps of:

identifying a fourth dependent source register associated with a fourth dependent source operand of the second instruction;

comparing an ID of the fourth dependent source register with the third dependent source register ID to determine a second younger ID; and assigning the second younger ID to a corresponding one of the third dependent source operand and the fourth dependent source operand.

24. The method as set forth in claim 23 further comprising the steps of:

comparing the second younger ID associated with the corresponding one of the third and fourth dependent source operands with the next retire ID; and scheduling the second instruction for execution if the second younger ID is one of: 1) less than the next retire ID and 2) equal to the next retire ID.

* * * * *